Figure 1:
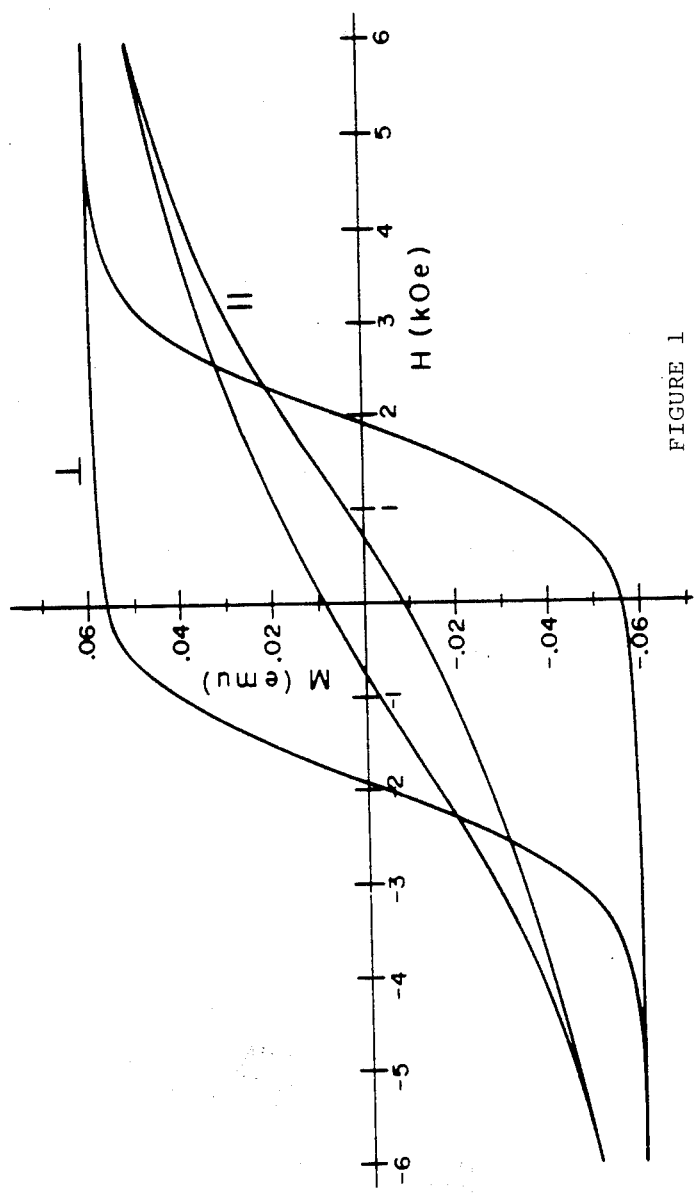

United States Patent [19]

Moskovits et al.

[11] Patent Number: 4,808,279

[45] Date of Patent: Feb. 28, 1989

[54] PROCESS FOR PREPARING MAGNETIC RECORDING MATERIAL

[75] Inventors: Martin Moskovits, Toronto, Canada; Beat Schmidhalter, Basel, Switzerland

[73] Assignee: The University of Toronto Innovations Foundation, Toronto, Canada

[21] Appl. No.: 914,260

[22] Filed: Oct. 2, 1986

[51] Int. Cl.$^4$ ............................................. C25D 11/20
[52] U.S. Cl. .................... 204/28; 204/37.6; 204/38.3; 204/42; 204/58
[58] Field of Search ............... 204/33, 37.6, 27, 28, 204/58, 38.3, 42

[56] References Cited

U.S. PATENT DOCUMENTS

| | | | |
|---|---|---|---|
| 3,466,156 | 9/1969 | Peters et al. | 428/606 X |
| 3,959,090 | 5/1976 | Höllrigl et al. | 204/28 |
| 4,472,533 | 9/1984 | Moskovits | 502/320 |
| 4,548,682 | 10/1985 | Yoshida et al. | 204/35.1 |
| 4,563,397 | 1/1986 | Ishiguro et al. | 428/469 |
| 4,650,708 | 3/1987 | Takahashi | 428/216 |

FOREIGN PATENT DOCUMENTS 1418933 12/1975 United Kingdom .

OTHER PUBLICATIONS

F. A. Lowenheim, Electroplating, McGraw-Hill Book Co., New York, 1978, pp. 57-59, 463-466.

Primary Examiner—John F. Niebling
Assistant Examiner—William T. Leader
Attorney, Agent, or Firm—Nixon & Vanderhye

[57] ABSTRACT

The invention provides a process for preparing magnetic recording material by depositing ferromagnetic material in particulate form into an aluminum substrate. The aluminum substrate is prepared by cleaning an aluminum or aluminum metal containing substrate; anodizing the cleaned metal substrate, to produce a suitably pitted or porous oxide substrate surface; and rinsing the anodized substrate, substantially to remove therefrom acid residues remaining from the anodizing step. The substrate in contact with a liquid solution of a salt of at least one ferromagnetic metal is then subjected to electrolysis with alternating current, to deposit the metal into the pores of the oxide in small-particle, ferromagnetic form while adjusting and controlling the frequency of the alternating current to obtain discrete particles in the pores assembled in an anisotropic configuration. Excess liquid solution is subsequently removed from the so-treated substrate. The material is then preferably coated with a suitable resin or polymer to seal the pores and then polished to generate a suitable surface for reading or writing by magnetic heads.

13 Claims, 3 Drawing Sheets

PROCESS FOR PREPARING MAGNETIC RECORDING MATERIAL

This invention relates to magnetic recording material and methods for preparation thereof. More particularly, it relates to a form of magnetic recording material which comprises a pitted or porous aluminum oxide film having ferromagnetic particles deposited in the pits and pores therein, and processes for preparation of such magnetic recording materials.

State-of-the-art magnetic recording disks are moulded from mixes of fine particles of oxides of iron, cobalt or other ferromagnetic substances and plastic composites. It is very difficult to achieve correct anisotropy of the particles by means of a such a process. This limits the coercivity of these magnetic recording disks, which limits the information density which can be recorded by the disk.

Coercivity is the magnetic field required to invert the magnetic moment of the magnetic material and hence make a magnetic record. It is desirable to have high coercivity, so that the information density which can be recorded by the magnetic particles can be increased, without their inverting and erasing adjacent information through interactions.

To obtain the highest possible coercivity it is necessary to obtain magnetic elements with small individual magnetic domains and the smallest number of domains possible. Single domain particles are ideal.

The term "domain" pertains to the concept of individual magnets within a single piece of ferromagnetic material. For example, a lump of iron consists of many domains, each of which is itself a magnet, all these magnets having random polarity so that they cancel out. When a magnetic field is applied, the domains which are aligned with the field grow larger, and those not oriented with the field grow smaller. Eventually one obtains a critical field at which the material is all one single aligned domain. The magnetic moment of the material is then at its maximum.

If one has a collection of single domain particles, the sizes of the domains cannot change, so that the particles sit dormant until a critical field is applied, and then all the domains suddenly invert their polarity. On attaining critical field, the polarities are inverted very suddenly, so that a very square hysteresis loop is obtained from single domain particles. In other words, the material has a large coercive force, a highly desirable property in magnetic recording material.

Thus to keep a sharp magnetic inversion, it is desirable to have magnetic particles of small and uniform size. Such are not found in state-of-the-art recording disks.

The term "anisotropy" refers to the property of being more readily magnetized in one specific direction. If a unit magnetic element having such a property is magnetized, it is relatively difficult to erase. In respect of magnetic tape, it is preferred that the more readily magnetizable direction be along the tape. In respect of a magnetic disk, it is preferred that the more readily magnetizable direction be perpendicular to the plane of the surface of the disk.

To enhance or improve anisotropy it is necessary to have particles with a larger dimension perpendicular to rather than parallel to the plane of the surface of the disk. Such combined small particle size and anisotropy are not found in state-of-the-art recording disks.

The problems of obtaining both particles of high coercivity and anisotropy are addressed in U.K. Pat. No. 1,418,933 to Pilot Man-Nen-Hitsu Kabashiki Kaisha. This patent discloses a magnetic recording material comprising aluminum on the surface of which a porous film is deposited by anodic oxidation treatment. Each of the pores contain a magnetic substance deposited therein by electrolytic treatment. However, the coercivities of the materials reported therein do not appear to be any significant improvement over state-of-the-art material.

It is an object of the present invention to provide a magnetic recording disk of increased coercivity and improved anisotropy, and processes for their preparation.

Accordingly, the invention provides a process for preparing magnetic recording material by depositing ferromagnetic material in particulate form into an aluminum substrate. The aluminum substrate is prepared by cleaning an aluminum or aluminum metal containing substrate; anodizing the cleaned metal substrate, to produce a suitably pitted or porous oxide substrate surface; and rinsing the anodized substrate, substantially to remove therefrom acid residues remaining from the anodizing step. The substrate in contact with a liquid solution of a salt of at least one ferromagnetic metal is then subjected to electrolysis with alternating current, to deposit the metal into the pores of the oxide in small-particle, ferromagnetic form while adjusting and controlling the frequency of the alternating current to obtain discrete particles in the pores of the oxide substrate surface, assembled in an aniostropic configuration. Excess liquid solution is subsequently removed from the so-treated substrate. The material is then preferably coated with a suitable resin or polymer to seal the pores and then polished to generate a suitable surface for reading or writing by magnetic heads.

According to a second aspect of the invention there is provided a magnetic recording material. This material consists of a substrate of aluminum or aluminum alloy containing a high proportion of aluminum; and at least one ferromagnetic metal selected from cobalt, nickel and iron. The at least one metal is present in the pores of the oxide in discrete, micro-particulate form, piled into pits and pores created in the substrate surface in an anisotropic configuration by anodizing thereof. The magnetic recording material has a coercivity in excess of 2000 oersted.

With cobalt, coercivities of 2030 oersted have been achieved in the perpendicular direction; while with iron a coercivity of 2220 oersted has been achieved in the perpendicular direction. For the same two materials the parallel coercivities were both 910 oersted indicating the high degree of anisotropy. With mixtures of Co and Fe a perpendicular coercivity of 2570 oersted has been achieved.

With the present invention, when a ferromagnetic metal such as iron, cobalt or nickel or a mixture thereof is chosen as the metal for deposition, and the frequency of applied alternating current for the electro depositions step is correctly controlled and adjusted, magnetic recording materials of very high quality can be obtained. In fact, magnetic recording materials of up to twice the coercivity of such similarly prepared materials disclosed in the aforementioned U.K. Pat. No. 1,418,933 can be obtained according to this invention. The preferred process according to the invention use, in the electrodeposition step, a partially rectified AC current of frequency 200 to 500 Hz; also, the pH of the electrodeposition bath is adjusted to a highly acid value, in the range 2.7-3.7 and for Co and Fe preferably in the range 2.8-3.5.

The substrate of the magnetic recording material of the present invention is aluminum metal or an alloy or composition thereof, e.g. aluminum-magnesium alloy, containing at least a major proportion of aluminum metal. It is suitable and convenient to use aluminum in the form of thin metal foil, for example the type of foil commonly used in domestic cooking applications. Such a form of substrate lends itself well to continuous handling and treatment, being available in long rolled lengths capable of being rolled and unrolled continuously. However, the invention is not limited to any specific form of aluminum substrate, and is applicable to use with aluminum strips, rods, sheets, plates, films and the like.

Thus, the magnetic recording material of the present invention may be made from an aluminum sheet substrate, which is cleaned, anodized and onto which the chosen metal is electrolytically deposited as described herein, following which the sheet may be cut into coupons. Alternatively, the ferromagnetic metal may be deposited, by the techniques described herein, onto aluminum particles, spheres, gauze, wire chips, flakes or wool.

As an early step in the process of the present invention, the substrate is cleaned for the purpose of removing grease from the surface thereof. This is best accomplished with a suitable organic solvent and then with an alkaline chemical liquid, so as to achieve a degree of surface etching, followed by neutralization of any residual alkali excess with acid. Sodium carbonate solution is a suitable base, followed by nitric acid, but many other chemicals can be chosen and used for this purpose. The preferred cleaning process is ultrasonic cleaning in dichloromethane, followed by treatment with dilute sodium carbonate and then with dilute nitric acid. It may also be desirable to remove oxide formed during the etching process.

Then the treated substrate is electrolytically anodized, for the purpose of depositing on the metal a surface porous layer of oxide. This anodizing is best accomplished by making the metal the anode of an electrolytic cell, using inert (e.g. lead) counter-electrodes, in an acidic bath. Suitably, the bath is a relatively dilute solution of an inorganic acid, such as sulphuric acid or phosphoric acid or an organic acid such as oxalic acid. In practice, a 13.8% sulphuric acid solution has been found to be most satisfactory, in providing pores of suitable diameter. Direct current is passed through the cell between the electrodes, at a current and voltage suitably adjusted to provide the correct film deposition. This operation is suitably conducted at room temperatures. In practice, a current of the order of 15 milliamps per square centimeter, at a voltage of 15 volts, in 13.8% by weight sulphuric acid has been found to provide suitable surface oxide characteristics.

For best use in the present invention, the pores in the aluminum oxide surface should be fairly small but not too small. They should be large enough to contain single domain magnetic particles, but not so small as to contain super-paramagnetic particles or so large as to contain multidomain particles. If the pores are too small, the ferromagnetic character of the metal particles therein will be lost.

One should avoid pores large enough to hold particles of smallest diameter greater than 350 Å. The height of the pores is controllable between 2,000 Å and 50 microns. The height of the pores is not controllable at heights less than 2,000 Å. It is desirable to keep the process as shallow as possible as the particles deposit at the bottom of the pores and for the most efficient recording the particles should be as close as possible to the magnetic head of the recorder.

After suitable anodizing as described, the substrate is removed from the anodizing bath and rinsed. It is important to rid the surface of the treated substrate of residual acid, and neutralize it at this point. It is, however, undesirable to neutralize the acid chemically, since this might have the effect of damaging the deposited film. However, if residual acid is left at the subsequent electrolysis step, hydrogen will be generated, which is undesirable. It is preferred to rinse the anodized film with suitable quantities of water, to remove acid and effect sufficient neutralization. After rinsing, the material is not dried, otherwise the pores may seal up.

Next, the ferromagnetic metal or metals are deposited electrolytically into the so-prepared substrate. In this process, the substrate is placed in an electrolyte having dissolved therein ions of the metal or metals to be deposited, along with an inert counterelectrode, e.g. graphite, and alternating current is passed through the two electrodes in the electrolyte. Normally the electrolyte will be an aqueous solution of suitable salts of the metals to be deposited, but it can under certain circumstances if desired to be a non-aqueous solution. The concentration range of the salt can be from 5% up to saturation. When cobalt is to be deposited, (cobalt sulfate) is suitably dissolved in the electrolyte medium.

One should avoid use in the electrolyte bath of salts of metals which contribute to the solution anions which would themselves harm the coating on the aluminum substrate during the process, e.g. by oxidation. An inhibitor, e.g. citric acid or ascorbic acid is preferably added to the electrolyte, especially when using iron, to prevent oxidation of the ferrous material to ferric material.

It is believed that the particles should have a size measured across their smallest diameter of from 30 to 350 Å, optimally about 100 Å. The lower critical limit is somewhere in the range of 30-80 Å, at room temperature, depending upon the nature of the material.

Concentrations of metal compound and other constituents in the electrolyte have some effect on the particle size, pH has a greater effect but the frequency and rectification of the alternating current have the greatest effect.

The use of alternating current in this electrolysis step is essential in the process of the invention. Alternating current causes the metal ions to become reduced (or in some cases oxidized) and deposited as metals in the porous oxide coating, in the desired small particle form. Typically the alternating current is passed for about 2-3 minutes. Results indicate that there is an initial surge of metal deposition, the rate of which rapidly declines after the first few minutes. Times of about 10 minutes at 14 volts RMS alternating current have been found suitable when depositing cobalt from (cobalt salt) in a boric acid containing bath. A suitable voltage range for cobalt is 10-20 V.

Saccharin may be added to the electrolyte as a stress reducer, preferably in the form of a saccharin salt. This has the effect of improving particle size uniformity especially when using cobalt. It was previously found difficult to obtain even, uniform particles when using cobalt.

The pH is a factor inside the pore, as the particle grows therein under the influence of the alternating current. The presence of hydrogen ions in the pores will affect the dynamics of particle growth. A certan pH is needed for the metal compound to be reduced to the metal, and each metal has its own preference where pH is concerned.

It is preferred to maintain the electrolyte at a substantially constant, strongly acidic pH, in the 2.7-3.7 range. For cobalt the pH should be between 2.8-3.7, for nickel 3.6-3.7, and for iron 2.7-3.0. This is suitably done by addition to the bath of appropriate quantities of weak acid such as boric acid, to avoid substantial evolution of gaseous hydrogen during the process.

To obtain the optimum coercivity and anisotropy of the magnetic elements, it is necessary to adjust the frequency of applied alternating current during deposition, by using a variable frequency power supply. The optimum alternating current waveform is partially rectified, which when plotted out would show a sine wave form in which the peaks above zero are of a different amplitude from the peaks below zero. This assists in controlling particle growth and hence the particle size.

Most preferred among the ferromagnetic materials of use in the present invention is cobalt, which can give materials having twice the coercivity of the prior art. Iron can give improved results over the prior art, but only cobalt can give an improvement in coercivity of up to a factor of two.

Following the electrolytic deposition of the metal, the treated metal substrate is suitably rinsed and cleaned, to rid the metal of residual boric acid. It may further be cleaned, e.g. by ultrasonic cleaning in ethanol. In practice these final cleaning steps to remove the residual boric acid are best conducted prior to use of the material since it appears that the residual boric acid may afford some protection against deterioration of the surface quality of the material on storage.

Finally, if desired, the magnetic recording material may be coated with a suitable resin, polymer or plastic to seal the pores and then polished to generate a suitable surface for magnetic reading and recording.

The invention is further illustrated in the following specific examples.

EXAMPLE 1

Magnetic recording materials were prepared using the method of the preferred embodiment of the invention.

Anodic films were prepared on aluminum substrates in one of two ways. These two ways respectively used: (a) 1.0M $H_3PO_4$ solution, 5 mA/cm$^2$ against a lead electrode, at 23° C. to create a phosphoric acid film; and (b) 1.5M $H_2SO_4$, 16 mA/cm$^2$ against a lead electrode at 23° C. to create a sulphuric acid film.

The anodizing voltage was varied from 10 to 20 V DC for the various substrates and films were deposited on the substrates.

The compositions of the metal deposition baths used were as follows:
1. Cobalt bath
   120 g/l $CoSO_4.7H_2O$
   45 g/l $H_3BO_3$
   1.0-1.5 g/l saccharin
   pH 2.8-3.7
2. Nickel bath
   120 g/l $NiSO_4.6H_2O$
   45 g/l $H_3BO_3$
   pH 3.6-3.7
3. Iron bath
   120 g/l $FeSO_4.7H_2O$
   45g/l $H_3BO_3$
   0.5-1.5 g/l ascorbic acid
   pH 2.7-3.0
4. Iron/Cobalt bath
   36 g/l $FeSO_4.7H_2O$
   84 g/l $CoSO_4.7H_2O$
   45 g/l $H_3BO_3$
   1.0-1.5 g/l saccharin
   0.5-1.5 g/l ascorbic acid
   pH 2.8-3.7

Sulfuric films deposited on aluminum were placed in either cobalt, nickel, iron or iron/cobalt baths, and phosphoric films were placed in a nickel bath. Electrodeposition of the metal in the bath into the substrate was done with 14 V RMS of AC variable frequency 50 to 500 Hz against graphite electrodes.

Figure 2:
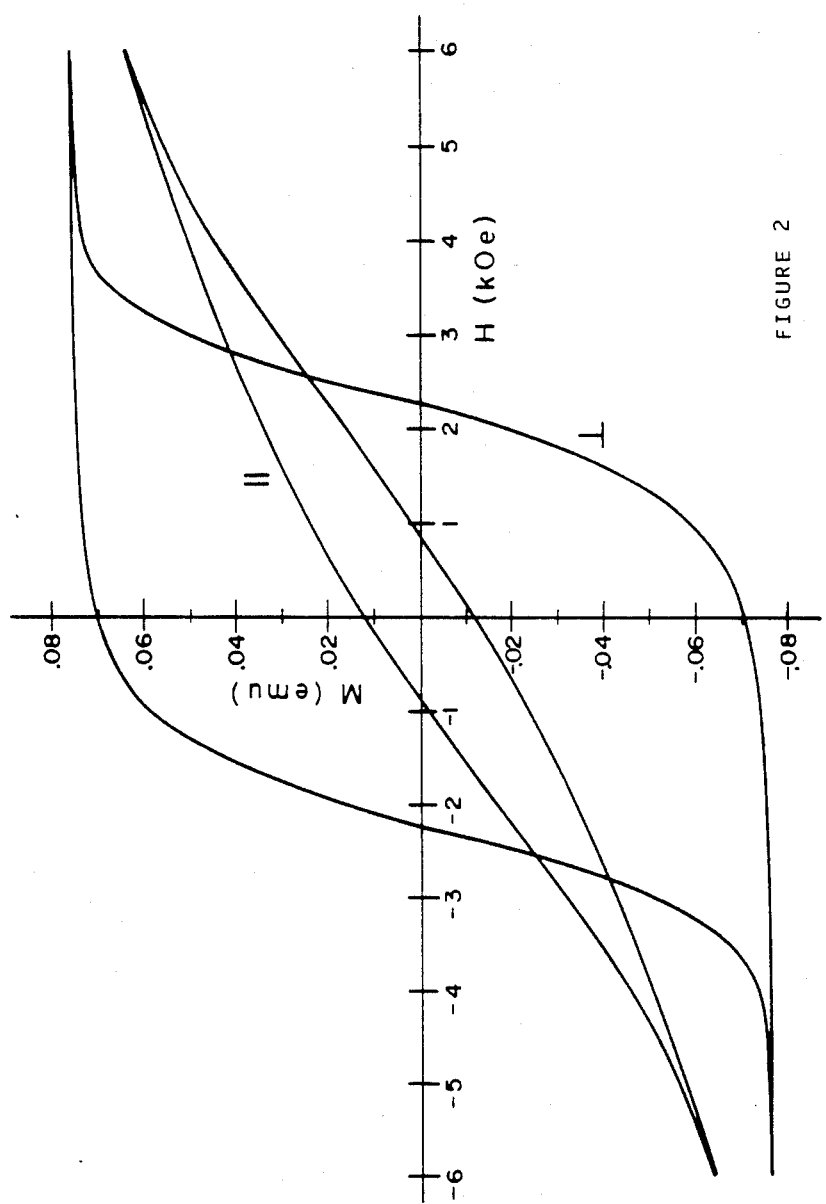
Figure 3:
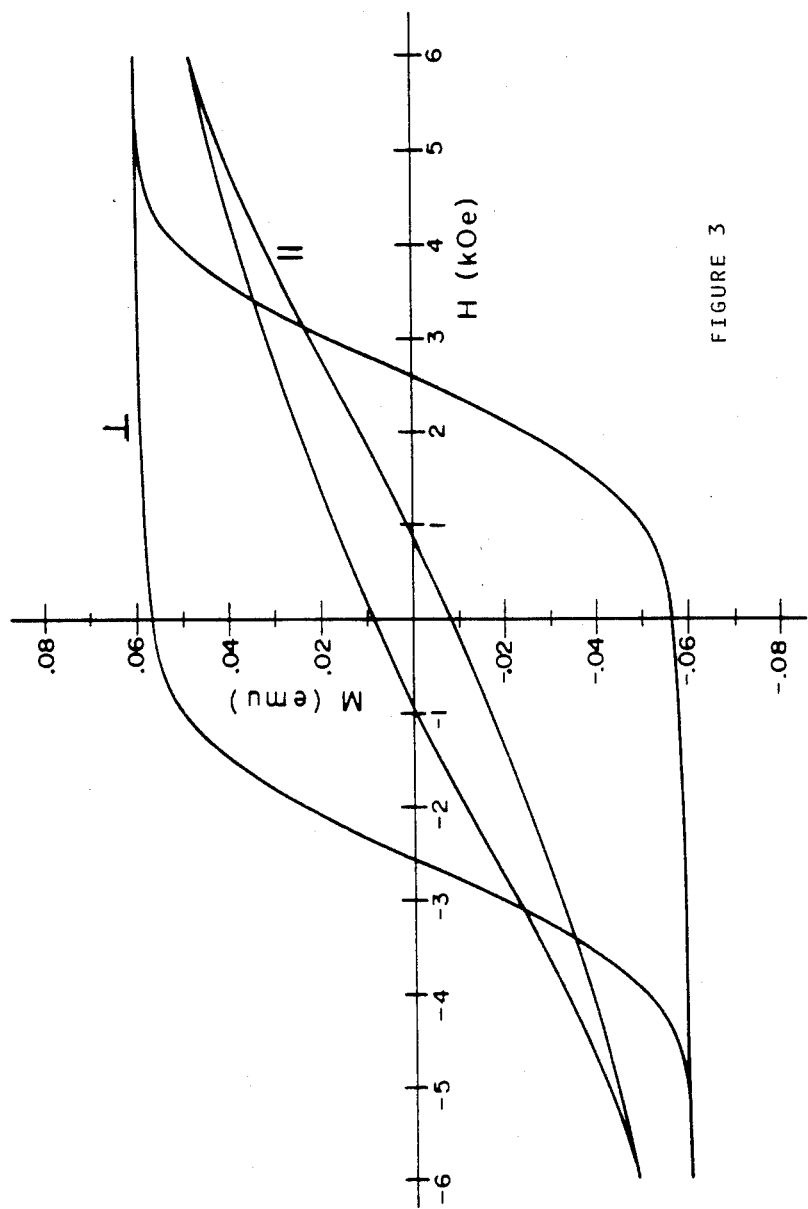

The results of the deposition were as given in the following tables. FIGS. 1 to 3 show hysteresis loops for the results in Tables I, IV and V respectively.

TABLE I

| | Cobalt (in sulfuric acid films 15 V DC) | | | | | |
|---|---|---|---|---|---|---|
| | deposition time | frequency Hz | squareness (perpendicular) | coercivity (perpendicular oersted) | squareness (parallel) | coercivity (parallel oersted) |
| (1) | 30 sec | 200 | 0.87 | 1770 | 0.14 | 580 |
| (2) | 3 min | 200 | 0.90 | 1730 | 0.20 | 885 |
| (3) | 10 min | 200 | 0.92 | 1900 | 0.157 | 740 |
| (4) | 20 min | 200 | 0.916 | 2030 | 0.186 | 910 |
| (5) | 3 min | 50 | 0.87 | 1720 | — | — |
| (6) | 3 min | 500 | 0.84 | 1850 | 0.21 | 910 |

A typical hysteresis curve is shown in FIG. 1, which refers to sample 3 in the above table.

TABLE II

| | Nickel (in sulfuric acid films 15 V DC) | | | | | |
|---|---|---|---|---|---|---|
| | deposition time | frequency Hz | squareness (perpendicular) | coercivity (perpendicular oersted) | squareness (parallel) | coercivity (parallel oersted) |
| (1) | 3 min | 200 | 0.83 | 540 | 0.13 | 255 |

TABLE II-continued

Nickel (in sulfuric acid films 15 V DC)

| | deposition time | frequency Hz | squareness (perpendicular) | coercivity (perpendicular oersted) | squareness (parallel) | coercivity (parallel oersted) |
|---|---|---|---|---|---|---|
| (2) | 20 min | 200 | 0.78 | 420 | 0.12 | 175 |

TABLE III

Nickel (in phosphoric acid films)

| | anodizing voltage | deposition time | frequency Hz | squareness (perpendicular) | coercivity (perpendicular oersted) | squareness (parallel) | coercivity (parallel oersted) |
|---|---|---|---|---|---|---|---|
| (1) | 15 | 30 sec | 200 | 0.37 | 540 | 0.26 | 185 |
| (2) | 15 | 1 min | 200 | 0.43 | 660 | 0.20 | 240 |
| (3) | 15 | 2 min | 200 | 0.41 | 640 | 0.21 | 260 |
| (4) | 15 | 5 min | 200 | 0.42 | 600 | 0.20 | 260 |
| (5) | 20 | 5 min | 200 | 0.44 | 615 | 0.19 | 230 |
| (6) | 25 | 5 min | 200 | 0.44 | 595 | 0.19 | 250 |

TABLE IV

Iron (in sulfuric acid films)

| | anodizing voltage | deposition time | frequency Hz | squareness (perpendicular) | coercivity (perpendicular oersted) | squareness (parallel) | coercivity (parallel oersted) |
|---|---|---|---|---|---|---|---|
| (1) | 15 | 30 sec | 200 | 0.75 | 1220 | 0.22 | 970 |
| (2) | 15 | 3 min | 200 | 0.84 | 1850 | 0.17 | 770 |
| (3) | 15 | 10 min | 200 | 0.91 | 2220 | 0.163 | 910 |
| (4) | 15 | 20 min | 200 | 0.90 | 2180 | 0.22 | 1200 |

The hysteresis curves for iron in sample 3 is shown in FIG. 2.

TABLE V

Iron/Cobalt mixtures 0.3/0.7 moles % in deposition bath

| | anodizing voltage | deposition time | frequency Hz | squareness (perpendicular) | coercivity (perpendicular oersted) | squareness (parallel) | coercivity (parallel oersted) |
|---|---|---|---|---|---|---|---|
| (1) | 15 | 15 sec | 200 | 0.92 | 2570 | 0.15 | 910 |

The hysteresis curve for this mixed metal sample is shown in FIG. 3.

Materials having high coercivity with hysteresis loops having a high degree of squareness were thereby obtained.

We claim:

1. A process for preparing magnetic recording material comprising the steps of:
   cleaning an aluminum or aluminum metal containing substrate;
   anodizing the cleaned metal substrate in an acid bath, to produce a pitted or porous oxide substrate surface;
   rinsing the anodized substrate, substantially to remove therefrom acid residues remaining from the anodizing step;
   subjecting the substrate in contact with a liquid solution of a salt of at least one ferromagnetic metal to electrolysis with partially rectified alternating current to deposit the metal into the substrate in small-particle, ferromagnetic form of particle diameters in the range of 30 to 350 Å, while adjusting and controlling the frequency of said alternating current within the range 200-500 Hz, to obtain discrete particles in the pores aggregated in an anisotropic configuration; and
   removing excess liquid solution from the so-treated substrate.

2. The process of claim 1 wherein the AC electrolysis step is conducted in a metal salt solution of pH 2.7-3.7.

3. The process of claim 2 wherein said pH value is from 2.8-3.5.

4. The process of claim 1 wherein said ferromagnetic metal is selected from cobalt, iron, nickel and combinations thereof.

5. The process of claim 1 wherein the substrate is aluminum foil or sheet.

6. The process of claim 5 wherein the process is conducted continuously by passing a continuous long length of aluminum foil or sheet through successive cleaning, anodizing, rinsing, AC-electrolyzing and final cleaning stations, with appropriate residence times in each station.

7. The process of claim 1 wherein the metal is cobalt, deposited by AC-electrolysis from an aqueous cobalt solution.

8. The process of claim 7 wherein said liquid solution of at least one ferromagnetic metal also contains a stress-reducing agent.

9. The process of claim 8 wherein said stress-reducing agent is a saccharin salt.

10. The process of claim 1 wherein said liquid solution also contains oxidation inhibitors.

11. The process of claim 10 wherein said oxidation inhibitors are selected from ascorbic acid and citric acid.

12. The process of claim 1 wherein the pores obtained by anodizing the metal substrate are between 30 Å and 400 Å in diameter and between 2,000 Å and 15 μm in height.

13. The process of claim 1 further including the step of coating the treated substrate with plastic to seal the pores, and polishing said plastic.

* * * * *

UNITED STATES PATENT AND TRADEMARK OFFICE
CERTIFICATE OF CORRECTION

PATENT NO. : 4,808,279

DATED : February 28, 1989

INVENTOR(S) : Moskovits et al

It is certified that error appears in the above-identified patent and that said Letters Patent is hereby corrected as shown below:

Column 8:
Claim 12 line 3 delete "15" and replace by --50--

Signed and Sealed this

Nineteenth Day of October, 1993

Attest:

BRUCE LEHMAN

Attesting Officer

Commissioner of Patents and Trademarks